United States Patent [19]

Kertz

[11] 4,399,614
[45] Aug. 23, 1983

[54] HORSESHOE MEASURING DEVICE

[75] Inventor: Charles W. Kertz, 1310 Hwy. M, Barnhart, Mo. 63012

[73] Assignee: Charles W. Kertz, Barnhart, Mo.

[21] Appl. No.: 256,957

[22] Filed: Apr. 23, 1981

[51] Int. Cl.³ ............................................. G01B 3/16
[52] U.S. Cl. ............................... 33/149 R; 33/149 E; 33/149 F
[58] Field of Search ................. 33/150, 151, 458, 456, 33/149 R, 149 B, 149 E, 149 F, 149 G, 152 R, 152 B, 152 C; 7/118, 119, 120, 163, 164, 168, 170

[56] References Cited

U.S. PATENT DOCUMENTS

| 136,693 | 3/1873 | Bartle | 33/458 X |
| 487,635 | 12/1892 | McGown | 33/458 X |
| 818,627 | 4/1906 | Iwan | 33/149 R X |
| 1,187,842 | 6/1916 | Kaas | 7/168 |
| 1,199,155 | 9/1916 | Burriss | 33/153 R |

Primary Examiner—Harry N. Haroian

[57] ABSTRACT

This horseshoe measuring device consists primarily of a base member, which is used as a straight edge, for determining if a horseshoe player has a "ringer", or not, and a pair of pivotal arms are secured to the base member, for accurately measuring the distance between a pair of horseshoes and the anchored horseshoe peg. The device further consists of a file, for removing burrs from horseshoes, so as to prevent them from damaging the peg.

1 Claim, 6 Drawing Figures

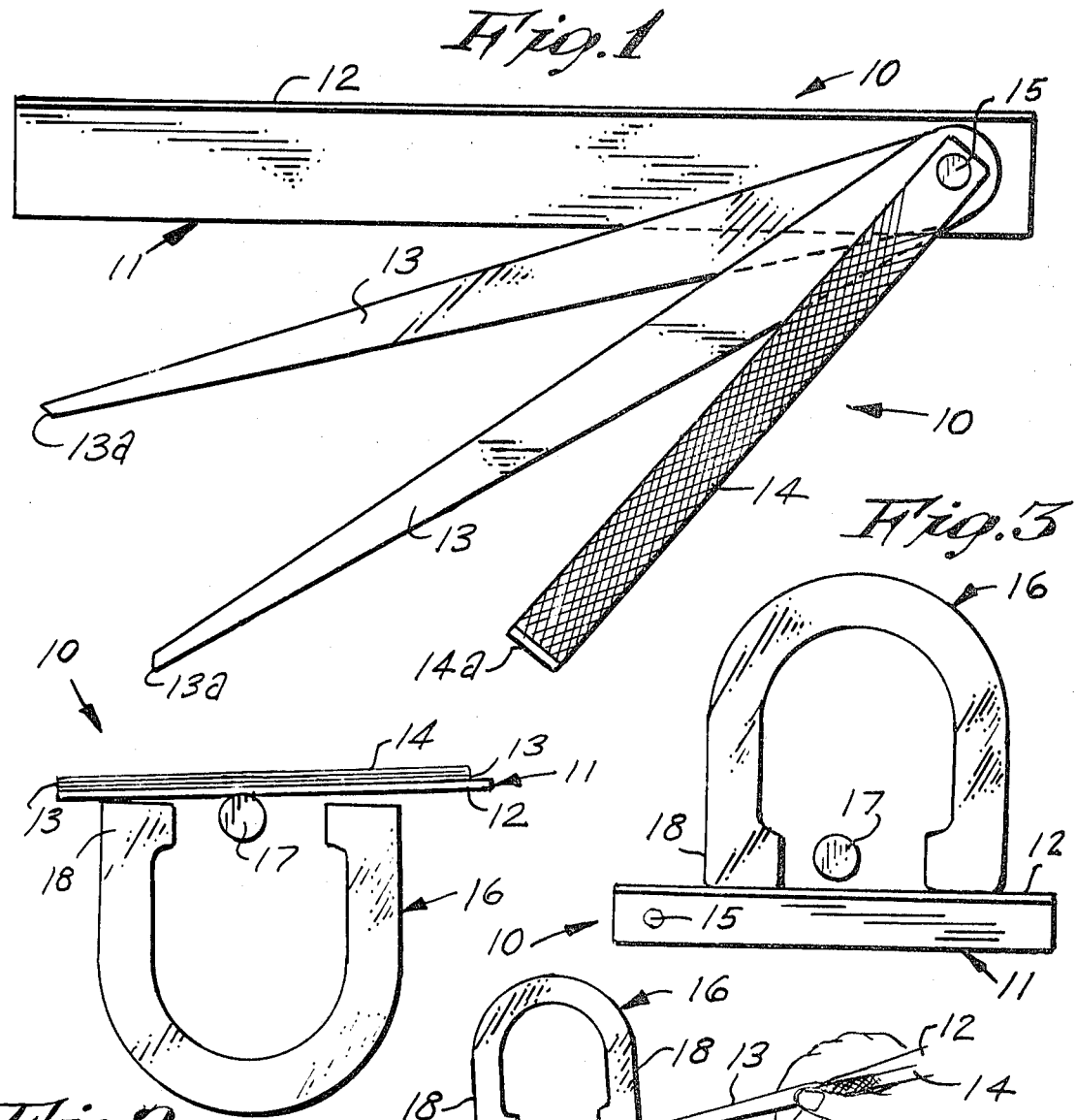
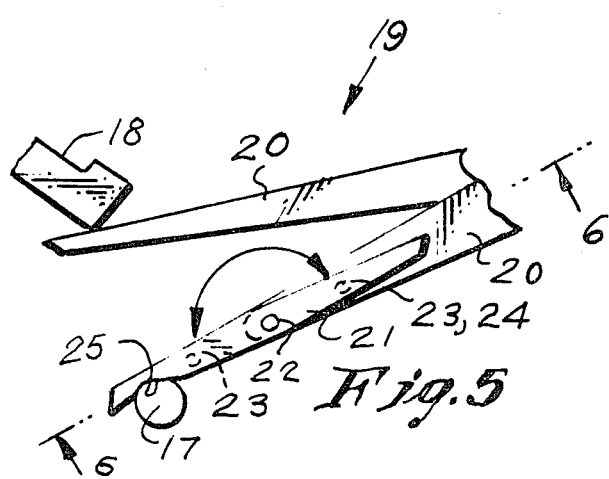

HORSESHOE MEASURING DEVICE

This invention relates to measuring instruments, and more particularly, to a horseshoe measuring device.

It is, therefore, the principal object of this invention to provide a horseshoe measuring device, which will enable the user to measure "ringers" quickly and easily, when throwing horseshoes.

Another object of this invention is to provide a horseshoe measuring device, which will include straight edge means of its assembly, for accurately measuring the horeshoe peg.

Another object of this invention is to provide a horseshoe measuring device, which will also employ caliper leg means, so as to enable a user to check the closest point of a pair of horseshoes, to the peg.

A further object of this invention is to provide a horseshoe measuring device, which will have file means included in its assembly, so as to enable the user to remove any burr that might occur on a shoe.

Other objects of the present invention are to provide a horseshoe measuring device, which is simple in design, inexpensive to manufacture, rugged in construction, easy to use and efficient in operation.

These, and other objects, will be readily evident, upon a study of the following specification, and the accompanying drawing, wherein:

FIG. 1 is a top plan view of the present invention, showing its components spread apart;

FIG. 2 is a side edge view of the device of FIG. 1, shown in use, in checking whether a horseshoe fully encloses a horseshoe peg;

FIG. 3 is a plan view of the device, shown in similar use, as illustrated in FIG. 2;

FIG. 4 is a plan view of the device, showing the use of its caliper arms, in checking the distances between a horseshoe peg and two cast shoes;

FIG. 5 is a fragmentary plan view of a modified form of the device, illustrating its use in measuring the distance of a horseshoe leg, from the horseshoe peg, and FIG. 6 is a cross-sectional view, taken along the line 6—6 of FIG. 5.

According to this invention, a measuring device 10 is shown to include a rectangular base 11, having a flange or lip 12 on one longitudinal side edge. A pair of tapered caliper arms 13, and a file 14, are fixedly secured to one end of base 11, by means of a rivet fastener 15, which enables 13 and 14 to pivot outwards from base 11, so as to be used, when desired.

It shall be noted, that the file 14 also includes a scraper tip 14a on its end.

In use, as illustrated in FIGS. 2 and 3, the base 11, of device 10, is used to determine whether the shoe 16 leg 13 portions have cleared the horseshoe peg 17, which is usually anchored in the ground, the base 12 being used as a straight edge.

In FIG. 4, the caliper arms 13 are pivoted on fastener 15, so as to have their pointed tips 13a in contact with, first, one horseshoe 16 and the peg 17, and then the arms 13 are placed in contact with the other shoe 16 and peg 17, so as to determine which shoe 16 is closer to the peg 17.

Referring now to FIGS. 5 and 6 of the drawing, a modified device 19 is shown to include a pair of pivotal caliper arms 20, one of which includes a pivotal extension 21 secured thereto, by means of pivot pin 22. A pair of spaced-apart nipples 23, on one side of extension 21, are alternately received in opening 24 of the associated arm 20, so as to lock extension 21 in one of its two selectable positions. One end of extension 21 includes a recess 25 on one edge, so as to engage the outer periphery of the peg 17, and the opposite end is pointed, also.

In use, device 19 is used in similar fashion as device 10, with the exception, that one caliper arm 20 employs the pivotal extension 21, so as to enable the user to have a choice of using the recessed end, or the pointed end, in measuring distances.

It shall be further noted, that file 14 is used to remove a burr, that sometimes occurs on a shoe 16, which could damage the peg 17, and the scraper tip 14a, of file 14, may be used to remove mud, or may be used for digging purposes.

While various changes may be made in the detail construction, it is understood that such changes will be within the spirit and scope of the present invention, as is defined by the appended claims.

What is claimed as new is:

1. A horseshoe measuring device, comprising, in combination, a base member, for being used as a straight edge in measuring the distance of the legs of a horseshoe from an anchored horseshoe peg, caliper means secured to said base, for measuring the distance between a pair of said horseshoes from said peg; said caliper means comprising a pair of tapered arms, secured pivotally at their one ends on a common pivot pin near one end of said base member, a first of said arms being pointed at its opposite end, and said pivot pin also pivotally retaining a file member by one of its opposite ends; the faces of said file member being used to remove burrs that occur on horseshoes, and the opposite end of said file member includes a scraper tip, for removing mud, and being also used for digging purposes; and a second of said caliper arms having an extension arm pivotally attached, at substantially its midpoint, to an end of said second caliper arm, said extension arm being pointed at one end and the other end having a recess formed in a side edge thereof, and cooperating detent means, adjacent said pivotal attachment, on said extension arm and the end of the second caliper arm for locking said extension arm in position so that one end or the other may be positioned for use with the pointed end of the first caliper arm.

* * * * *